(12) United States Patent  
Mueller et al.

(10) Patent No.: US 8,545,366 B2
(45) Date of Patent: Oct. 1, 2013

(54) SHIFTABLE CLUTCH DEVICE, PARTICULARLY FRICTION WET CLUTCH, DRIVE TRAIN FOR A HYBRID SYSTEM AND METHOD FOR OPERATING THE DRIVE TRAIN AND VEHICLE INCLUDING THE DRIVE TRAIN

(75) Inventors: Bruno Mueller, Sasbach (DE); Parviz Movlazada, Rastatt (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 295 days.

(21) Appl. No.: 12/999,410

(22) PCT Filed: May 22, 2009

(86) PCT No.: PCT/DE2009/000732
§ 371 (c)(1),
(2), (4) Date: Feb. 3, 2011

(87) PCT Pub. No.: WO2009/152793
PCT Pub. Date: Dec. 23, 2009

(65) Prior Publication Data
US 2011/0118079 A1    May 19, 2011

(30) Foreign Application Priority Data

Jun. 19, 2008   (DE) .......................... 10 2008 028 849
Aug. 11, 2008   (DE) .......................... 10 2008 037 330

(51) Int. Cl.
*B60W 10/02*   (2006.01)
*B60W 10/04*   (2006.01)

(52) U.S. Cl.
USPC .............................................. 477/5; 477/180

(58) Field of Classification Search
USPC ........................................................ 477/5, 180
See application file for complete search history.

(56) References Cited

U.S. PATENT DOCUMENTS

| 6,585,066 B1 | 7/2003 | Koneda et al. | |
| 2008/0023287 A1 | 1/2008 | Thiede et al. | |
| 2008/0032856 A1* | 2/2008 | Gohring et al. | 477/5 |
| 2008/0064561 A1* | 3/2008 | Popp et al. | 477/5 |

FOREIGN PATENT DOCUMENTS

| CN | 1997531 | 7/2007 |
| DE | 10025853 | 4/2001 |
| DE | 10310831 | 11/2003 |
| DE | 10222813 | 3/2004 |
| DE | 102006040117 | 3/2008 |
| EP | 1482195 | 12/2004 |
| WO | 2005123433 | 12/2005 |

* cited by examiner

*Primary Examiner* — Edwin A Young
(74) *Attorney, Agent, or Firm* — Simpson & Simpson, PLLC (57) ABSTRACT

A shiftable clutch device for disconnecting a first drive machine from a drive train and connecting it thereto, including a control device that can be actuated by a pressure medium, is characterized according to the invention in that the shiftable clutch device includes two partial clutches, a first partial clutch forming a main clutch and a second partial clutch forming a drag clutch, which are disposed and configured such that each is adapted to produce a drag torque in an end position of the control device, a first opening end position characterized by an open state of the main clutch and a second closing end position characterized by a closed state of the main clutch.

22 Claims, 5 Drawing Sheets

SHIFTABLE CLUTCH DEVICE, PARTICULARLY FRICTION WET CLUTCH, DRIVE TRAIN FOR A HYBRID SYSTEM AND METHOD FOR OPERATING THE DRIVE TRAIN AND VEHICLE INCLUDING THE DRIVE TRAIN

CROSS-REFERENCE TO RELATED APPLICATIONS

This application is the National Stage of PCT International Application No. PCT/DE2009/000732, filed May 22, 2009, which application published in German and is hereby incorporated by reference in its entirety, which application claims priority from German Patent Application No. DE10 2008 028 849.7, filed Jun. 19, 2008 and from German Patent Application No. DE10 2008 037 330.3, filed Aug. 11, 2008 which applications are incorporated by reference in their entirety.

FIELD OF THE INVENTION

The invention relates to a shiftable clutch device, in particular a friction wet clutch, for disconnecting and connecting a first drive machine from a drive train, the clutch device including a control device that can be actuated by a pressure medium.

The invention also relates to a drive train for a hybrid system for a vehicle, including at least a first drive machine and a second drive machine, which are connectable with a transmission or another transmission unit separately or jointly through a force transmission device, and including a shiftable clutch device for disconnecting and connecting the first drive machine from the drive train, wherein the clutch device is disposed between the first drive machine and the force transmission device.

The invention furthermore relates to a method for operating a drive system of this type.

BACKGROUND OF THE INVENTION

Hybrid systems for vehicle applications are known in the art in a plurality of embodiments. They all have in common that at least two different drive machines are provided in the drive train, through which the driving can be performed alternatively or jointly, wherein at least one of the drive machines is configured to function in a first operating mode as a drive machine and to function in a second operating mode as a machine for converting brake energy into another form of energy for intermediary storage and/or as drive energy for other consumers. For applications in vehicles, the first drive machine is often configured as an internal combustion engine, while the second drive machine is configured as an electrical machine, which is configured to feed electrical energy into a storage device when operated as a generator. A hybrid system of this type is illustrated e.g. in the printed document DE 103 10 831 A1, FIG. 30. The document discloses a force transmission device, which is disposed between two drive machines and a subsequent consumer configured as a transmission. In order to completely decouple the first drive machine from the drive train, a device for disconnecting/ facilitating a force flow is provided between the first drive machine and the force transmission device, wherein the device is configured as a shiftable clutch device, which is also designated as engine clutch or disconnecting clutch. The second drive machine is configured as an electrical machine, whose rotor is connected torque proof with the force transmission device. The force transmission device includes at least one startup element, preferably a hydrodynamic component, and this case, furthermore, a device for at least partially bypassing the force flow through a hydrodynamic component. The startup element is preferably configured as a shiftable friction clutch device, which is also designated as lockup clutch, and facilitates bypassing the hydrodynamic component in the force flow. The subsequent transmission which is typically configured as a shiftable variable speed transmission is characterized by a plurality of shift elements actuated by a pressure medium. In order to assure the pressure medium supply for the force transmission device and the shift elements of the transmission, a respective system for supplying and/or controlling an operating- and control medium is provided, including at least one hydraulic loop system, in which the required operating medium is fed with the respective pressure through a feed device configured as a so-called transmission oil pump. The function of the transmission pump is required e.g. for operating a hydraulic control, or the disconnecting and/or startup clutch(s). The transmission oil pump is preferably directly connected torque proof with the input of the force transmission device in order to assure safe function. This coupling facilitates propulsion in the various operating modes of the drive train.

BRIEF SUMMARY OF THE INVENTION

The following basic operating modes of a drive train of this type are possible in traction operation and they can be modified by additional sub modes:

Driving, in particular motorized driving with a force flow from the first drive machine, in particular the internal combustion engine, with a closed device for disconnecting/connecting the force flow between the first drive machine and the second drive machine to the transmission, in particular through a first and/or second power path of the force transmission device; and Driving, in particular electrical driving, with a force flow from the second drive machine, in particular the electrical machine, through a first and/or a second power path of the force transmission device for an open/disconnected device for disconnecting/implementing the force flow between the first drive machine and the force transmission device.

Emergency operations are characterized through a driving by the first drive machine, which is started by its own starter.

However, it is a substantial disadvantage of a system of this type that the known hydraulic systems employed, in particular during a standstill of one or both drive machines, e.g. also during a short time standstill, can idle due to the lacking driving of the transmission oil pump, since the loop is not maintained through the transmission oil pump due to the lack of propulsion, and the operating medium disposed in the system is run back to the operating medium supply through the respective return. When starting up again, e.g. when actuating the gas pedal, initially the hydraulic supply and thus the transmission oil pump would have to be driven, which in turn has to supply sufficient pressure and volume, so that the required shifting devices that have to be actuated are loaded and the hydrodynamic component is filled. Since this leads to substantial delays in the reaction to the actuation of the gas pedal, which may also create a safety risk in many situations, there is the necessity that the hydraulic system of the transmission has to be kept loaded with a low pressure also when the vehicle is standing still. The transmission oil pump used, thus has to be able to cover in particular the leakages of the hydraulic system when standing still. In order to assure this, the prior art often uses an additional electrically driven oil pump. Alternatively, the electrical machine of the hybrid system and the existing main oil pump can be used, which however, has technical disadvantages. Thus, an additionally provided and electrically driven oil pump creates substantial additional complexity. On the other hand, also, not using an additional pump of this type is associated with numerous disadvantages. When the clutch device is open in a state without pressure for an embodiment of this type, emergency operating capabilities are not assured anymore. Even when the combustion engine is started through an additional starter, no oil pressure can be built up in the transmission, since the clutch device "open without pressure" cannot be closed, so that the oil pump is being driven. However, when a clutch device is being used which is closed in a condition without pressure, the transmission oil pump is immediately also driven in emergency operating mode and the system operates like the system of a conventional automatic transmission. However, the high complexity for adapting the clutch device is a substantial disadvantage.

For the known drive trains, however, problems can occur when controlling the engine clutch when the transmission is e.g. malfunctioning due to a control error and is being operated in an emergency mode. When an error of this type occurs also a possibly existing additional pump is not usable since it is also controlled by the transmission control.

It is furthermore required in the "electric drive mode" that the engine side clutch is completely open in order to avoid drag losses through the friction surface bearing and/or friction surface elements rotating relative to one another. Thus, in this operating range however, in most cases the required minimum pressure for completely opening the clutch is not provided. Using a clutch that is closed without pressure causes very high pressures when driving. This degrades the efficiency of the entire system.

A solution which, however, is difficult to control from a technical point of view, would be conceivable in which the wet clutch and the torque converter interact with one another hydraulically.

Another prior art drive train, however, is known from the German patent application DE 10 2006 040 117 A1.

Thus, it is the object of the invention to improve a drive train for a hybrid system as recited supra, so that the hybrid system is configured to overcome the recited disadvantages possibly without an additional pump on top of the transmission oil pump which is provided and required already. Thus, it is furthermore an object of the invention to provide a drive train for a hybrid system with improved emergency operating features. Thus, the different requirements have to be fulfilled with minimum complexity. Thus, the shiftable clutch device in particular the engine clutch has to be configured to be opened with the smallest amount of friction possible during electric driving, whereas the clutch should be closed during emergency operations of the transmission in order to be able to drive the transmission and thus the transmission oil pump.

The solution according to the invention is characterized by the features 1 and 18 for an actuatable clutch device and a drive system. A method according to the invention for operating a drive system of this type is presented. A vehicle is including the actuatable clutch device and drive system is also presented.

An actuatable clutch device for disconnecting and connecting a first drive machine from a drive train with a shifting device actuatable through a pressure medium is characterized according to the invention in that the actuatable clutch device is made from two partial clutches, a first partial clutch forming a main clutch and second partial clutch forming a drag clutch which are arranged and configured, so that each clutch is configured to generate friction torque respectively in an end position of the shifting device, a first open end position characterized by the open condition of the main clutch and a second closed end condition characterized by the closed condition of the main clutch.

The shiftable clutch device in a particularly advantageous embodiment is a hydraulically actuatable wet clutch. According to the invention the wet clutch is configured to be effective and transfer torque on both sides, this means during pressure loading from both sides, wherein the torque transmission capability can be very different depending on the actuation device. The first partial clutch configured as a main clutch is thus used for transferring torque during normal operations, while the second partial clutch configured as a drag clutch only transfers a minimum torque with a certain size in an open condition of the main clutch. Thus, the second partial clutch which is actuatable in the open end position of the shifting device for the actuatable clutch device and thus for the main clutch is configured and designed, so that a smaller torque is transferable through this clutch than through the actuated first partial clutch in the closing end position of the actuation device. Since using shiftable clutch devices of this type in drive trains for hybrid systems the input of the force transmission device configured to be coupled with the shiftable clutch device is connected with the second drive machine and a feed device, in particular a transmission oil pump for operating and control media of a operating medium supply and conduction system, the feed device can still be driven also in an open position of the shiftable clutch device through providing a transferable minimum torque. Thus, the second partial clutch is configured and sized, so that it is configured to drive at least the feed device and possibly the second drive engine connected with the force transmission device. The second partial clutch is thus configured for a transferable minimum torque in the range of 3-80 Nm preferably 3-20 Nm, preferably 3-10 Nm.

The transferable required minimum torque which is sized, so that it is sufficient to assure at least driving the feed device, in particular the transmission oil pump facilitates omitting an additional pump and a drive system in the operating medium supply and conduction system associated with the pump. The entire operating and control medium provision is preferably performed through only one feed device which also facilitates optimizing the conduit connections besides saving the additional pump.

The two partial clutches are preferably shiftable in parallel, this means the force flow can only be provided through one of the partial clutches by itself. Thus, erroneous actuations are excluded.

From a design point of view the shift device for the shiftable clutch device includes at least one piston element which is moveable into the closing end position through a mechanical preloading force, in particular a spring force into the open end position and through pressure loading with a pressure medium in particular a fluid. Since the actuation forces effective at the shift device for actuating the particular partial clutches are oriented opposite to one another in order to be able to assure a complete opening of the actuatable clutch device and thus of the two partial clutches in order to avoid disadvantageous drag losses, the particular partial clutches are configured and disposed, so that the pressure force generated at the piston element is adjustable through pressure loading the piston element, so that the pressure force is in equilibrium with the mechanical pre loading force in particular the spring force in an intermediary position between the two end positions of the shifting device characterized by opening both partial clutches.

The shiftable clutch device includes a first clutch portion configured to be coupled with a drive machine and a second clutch position to be coupled with an output or the remaining drive train and respectively including friction surface bearing and/or friction surface forming elements. The clutch components can be brought into operative engagement with one another at least indirectly through the actuation device. The first and the second clutch portion form the main clutch. The actuation device includes a piston element which is connected with one of the two clutch components and supported at the clutch component axially moveable thereon to forming a cavity configured to be loaded with pressure medium. The piston element is furthermore associated with a device for generating an actuation force oriented opposite to the pressure force generated through the pressure chamber. This device in the simplest case includes a preloading element which is effective at the piston element and supported at one of the clutch components or a connection element connected torque proof with the clutch component. The preloading element as a function of the association with the shifting device and with one of the clutch components or with an element coupled torque proof with the clutch component includes a disc spring device or a compression- or tension spring device which preferably directly loads the shifting device of the shiftable clutch device.

As a function of the particular embodiment of the second partial clutch as a drag clutch for transmitting a minimum torque, the preloading element in a first embodiment can be disposed between the shifting device of the actuatable clutch device and the second clutch component or the connection of the second component with the input of the force transmission device, the input of the force transmission device or an element connected torque proof therewith, in particular a housing wall, or according to a second embodiment, it can be disposed between the shifting device and the first clutch component or an element connected torque proof therewith.

The configuration of the second partial clutch is provided for reducing the number of components, and for increasing the functional concentration of the particular components in a particularly advantageous manner using components of the first partial clutch and/or the shifting device. In a first sub-embodiment, the second partial clutch is formed by a portion of the friction surface bearing and/or friction surface forming elements of the first partial clutch. Thus, preferably, a particular shifting device is associated with the second partial clutch, wherein the shifting device, however, is mechanically coupled with the shifting device of the main clutch in order to prevent actuation errors. Thus, the shifting device of the second partial clutch includes a piston element which is preferably connected torque proof with the piston element of the actuation device of the main clutch. The connection can be provided locally fixated, or with an option of a relative movement in an axial direction.

Furthermore, the second partial clutch can be formed according to a second sub-embodiment by an element which is connected torque proof with the first or the second clutch component or an element coupled torque proof therewith, and the respective other clutch component or an element connected torque proof therewith. In this case, the respective components form an input and an output of the second partial clutch. The surfaces forming the friction pairing can be provided with a coating or a liner. The actuation device of the main clutch, in particular the piston element, functions in the open end position as a shifting device for the second partial clutch.

On the other hand, it is provided in an advantageous embodiment, while minimizing the component number and the required installation space, to connect the shifting device torque proof with the first or second clutch component or an element connected torque proof with these components and to configure the second partial clutch between the actuation device and the other respective clutch component or an element connected torque proof therewith. In this case, the shifting device, which is provided anyhow, simultaneously functions as an input or output of the second partial clutch and as a shifting device for them. The embodiment can be retrofitted without additional components in already existing clutch devices in a simple manner.

The elements connected torque proof with the clutch components are connection elements, e.g. configured as hubs, housing components, walls or other rotatable components.

In order to assure a complete opening of the clutch device, and thus of the two partial clutches in the operating mode "electric driving", also the drag clutch has to be opened in a disconnected condition of the main clutch. This is implemented by applying pressure that facilitates removing the frictional engagement between the particular clutch components operatively engaging one another, in particular input and output of the drag clutch. This can be facilitated through an electrical auxiliary pump or through a control of the pressure medium supply to the pressure cavity when loading through the transmission oil pump, which is also driven in the electrical operating mode.

In a particularly advantageous embodiment, a hydrodynamic connection is provided between the pressure cavity of the shiftable clutch device loadable with pressure medium and the clutch environment which corresponds to the inner cavity of the actuatable clutch device, wherein the hydrodynamic connection is controllable as a function of the size of the compression force of the actuation device. In order to facilitate an automatic control, a connection between the pressure cavity and the inner cavity is provided in a preferred embodiment through the actuation device, in particular the piston element, wherein the connection opens in the portion of the piston surface effective at the clutch components to be connected, and thus automatically provides a reduction of the flow-through cross section with increasing actuation force in a direction towards closing the main clutch, and thus the closing end position of the actuation device, through coverage.

The force transmission device can have various configurations. The force transmission device includes a converter configured as a hydrodynamic component and an additional actuatable clutch device for circumventing the force flow through the hydrodynamic component, wherein an operating medium supply and a routing system is associated with the hydrodynamic component. The operating medium supply- and routing system includes at least one input with a feed device included in the input, in particular a transmission oil pump, a return and conduits and channels for routing the operating medium through the force transmission device between at least two connections, wherein the flow direction within the force transmission device is controllable through controlling the connections. Thus, according to an advantageous embodiment, at least the connection to the pressure chamber of the shifting device of the shiftable clutch is also configured to be coupled with the operating medium supply system and loadable with pressure medium. This assures with increasing pressure in the system that the pressure is also applied to the actuatable clutch device, so that it is closed quickly.

A drive train according to the invention of a hybrid system for a vehicle including at least one first drive machine and a second drive machine which are separately or jointly connectable through a force transmission device with a transmission and a shiftable clutch device disposed between the first drive machine and the force transmission device for disconnecting and connecting the first drive machine and the drive train is characterized in that a torque transferring operative engagement is establishable from the first drive engine to the input of the force transmission device when the shiftable clutch device is open and disconnected.

In a particularly preferable manner the transmission and/or the force transmission device and/or the actuatable clutch device is associated with a operating medium supply and/or routing system including at least one feed drive, in particular a transmission oil pump which is mechanically coupled with the input of the force transmission device. The transmission oil pump is also driven through transmitting a torque to the input of the force transmission device and can build up a required pressure without an additional pump relatively quickly also when the shiftable clutch device is disconnected.

In a preferred embodiment a torque transmitting operative engagement with the transmission can also be established when the shiftable clutch device is open and disconnected. Thus, a minimum torque can be transferred for particular functions. It is also possible to couple the transmission oil pump not to the input of the force transmission device, but to the output or the transmission shaft. This makes the assembly more variable.

Preferably the torque that is transferable for disconnecting and connecting the first drive machine and the drive train is limited to a minimum torque, when the shiftable clutch device is disconnected, wherein the minimum torque is smaller than the torque that is transferable to the shiftable clutch device in normal operations. The transferable torque is preferably selected in a range between 3 Nm and 80 Nm, preferably 3 Nm and 20 Nm, preferably 3 Nm and 10 Nm particularly preferably 10 Nm.

The shiftable clutch device is configured for assuring a transmission of large moments for a minimum space requirement preferably as a wet clutch actuatable through a pressure medium, wherein the wet clutch is coolable in particular operating modes through a coolant flow, wherein the coolant flow is also extractable from the operating medium supply and/or routing system of the force transmission device depending on the embodiment of the force transmission device.

The shiftable clutch device for disconnecting and connecting the first drive machine and the drive train is preferably configured and disposed, so that it is loadable with low pressure and low volume flow in an open, disconnected condition. Thus, on the one hand side a coolant media flow can be provided from the pressure cavity of the actuatable clutch device independently from the supply system of the force transmission device. Furthermore, the pressure assures that the force flow over the shiftable clutch device is completely disconnected in the operating mode "electric driving".

The operative engagement between the force transmission device and the drive machine is provided through devices for transmitting a predefined minimum torque wherein the devices include a drag clutch that is shiftable in parallel with the shiftable clutch device. The drag clutch can thus be formed by a separate clutch in a first embodiment. In another second particularly advantageous embodiment the drag clutch, however, is formed by components of the shiftable clutch device and/or shifting device and the connection elements connected with these components.

According to the invention the drive train is characterized in that it includes a hydraulically activated wet clutch which is effective on both sides, this means under a pressure loading from both sides. Thus, the torque transmission capability is highly variable as a function of the actuation direction. Thus e.g. a spring element is provided for opening the clutch in main transmission direction. In the open position of the main clutch an additional drag clutch is actuated which can transmit sufficient torque from the running combustion engine in spite of the clutch being disconnected in order to drag start the converter and the transmission oil pump in transmission emergency operations. Thus during emergency operations the transmission oil pump can supply the converter, the clutch and transmission with pressurized oil. In a normal operating mode when the transmission control is not impaired, the drag clutch can be opened with low actuation pressure through an electrical auxiliary oil pump which may be provided. The controlled pressure and the spring element used for opening are in force equilibrium. For this control which is provided for the operating mode "electrical driving", possibly also the wet clutch can be cooled, e.g. through an aperture in the piston as a function of the prevailing pressure level. In order to shift into the operating mode "driving with internal combustion engine" the actuation pressure of the wet clutch is increased further, so that it closes and so that it can transmit the full torque. From this point onward no cooling is required anymore and the cooling can be interrupted.

Thus, the invention relates to a drive train with a wet clutch which generates a friction torque in both end positions of the pressure piston. The piston is brought into the opening end position through a spring force. In this position only a small torque is transferrable between input and output. The closing end position is reached through pressure loading the piston. A larger torque can be transmitted in this position. For a low intermediary pressure the pressure force and the spring force are in equilibrium and both partial clutches are open.

For an open main clutch the transferrable torque of the drag clutch is between 3 Nm and 80 Nm. Typical oil pumps require a drive torque of approximately 10 Nm. The drag clutch is already configured for this drive torque.

The drive train according to the invention for a hybrid system is configured in a particularly preferred embodiment as a drive train in a vehicle, in particular a land vehicle for energy optimized operations.

BRIEF DESCRIPTION OF THE SEVERAL VIEWS OF THE DRAWING

The solution according to the invention is subsequently described with reference to drawing figures, wherein.

DETAILED DESCRIPTION OF THE INVENTION

Figure 1:
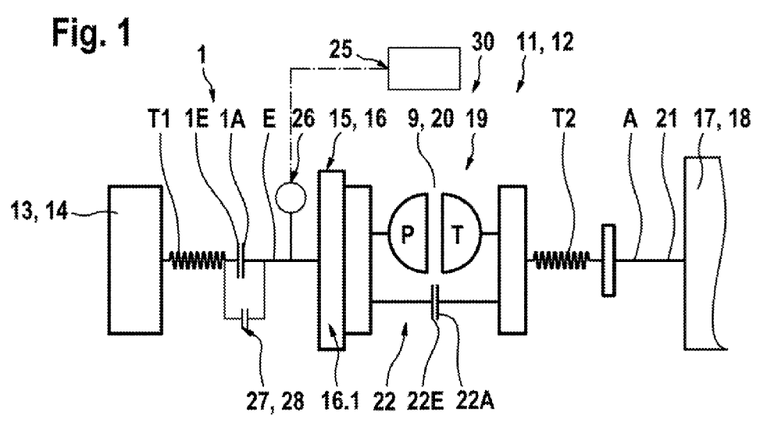
FIG. 1 illustrates the basic configuration and the basic function of a drive train according to the invention in a simplified schematic depiction.

FIG. 1 illustrates the basic configuration and the basic function of a drive train 11 configured according to the invention in a simplified schematic depiction for a hybrid system 12 for use in vehicles. The drive train includes a first drive machine 13 which includes at least a firsts drive machine 13 which is configured in the form of a internal combustion engine 14, in particular a diesel engine and the drive train includes a second drive engine 15 which is configured as an electrical machine 16 which is operable at least as a motor and/or as a generator. The coupling of the particular drive machines 13 and 15 with additional transmission units 17 in the drive train 11 in particular configured as a transmission 18 and the remaining components of the drive train 11 coupled with the transmission is performed through a force transmission device 19 including an input E configured to be coupled with the respective drive machine 13, 15, at least one output A connected with the transmission 18 and at least one start up element 9. The output A of the force transmission device 19 is either formed directly by a transmission input shaft 21 or it is connected torque proof there with. In the illustrated case the start up element 9 is configured as a hydrodynamic component 20 in an advantageous embodiment. The hydrodynamic component includes at least one primary shell P operating as a pump shell P in a force flow from one of the drive machines 13, 15 to the transmission 18 and a secondary shell functioning as a turbine shell T. Thus, the pump shell P is mechanically coupled with the input E of the force transmission device 19 and forms an integral unit there with. The turbine shell T is connected at least indirectly, this means directly or through additional transmission elements, herein a device T2 for damping vibrations with the output A of the force transmission device 19. The force transmission device 19 furthermore includes a shiftable clutch device 22 for circumventing the hydrodynamic component in the force flow in order to facilitate a use of the hydrodynamic component 20 only in ranges with high efficiency and to bypass it in the ranges of the low efficiency. Typically, shiftable clutch devices 22 of this type are configured in the form of friction locked clutches, preferably in the form of disc clutches including a first clutch component 22E connected at least indirectly with the input E of the force transmission device 19 and a second clutch component 2A connected at least indirectly with the output A thus over the vibration damper T2.

The force flow can either be respectively run from one of the drive machines 13 or 15 through the force transmission device 19 to the transmission 18 or by both together in that the two drive machines 13 and 15 are operated in parallel. In order to facilitate a exclusive force transmission from the second drive machine 15 to the transmission 18 or in order to be able to generate a large percentage of electrical energy for storage during coasting operation a device for alternative disconnection/connection of the force flow between the drive machine 13 and the force transmission device 19 is provided between the first drive machine 13, in particular the internal combustion engine 14, and the force transmission device 19, wherein the force transmission device is preferably configured as a shiftable clutch device 1, in a particularly preferred embodiment as a friction clutch device configured as a wet clutch. The clutch device 1 is thus also designated as engine clutch. It includes at least a first clutch component 1E and a second clutch component 1A which can be brought into operative engagement with one another at least indirectly through the shifting device 24 which is not illustrated herein, wherein the first clutch component 1E is connected at least indirectly torque proof with the first drive machine 13, in particular the internal combustion engine 14 and the second clutch component 1A is connected at least indirectly torque proof with the input E of the force transmission device 19. At least indirectly means in this context that the coupling can be performed directly or through additional transmission elements, herein e.g. a vibration damper T1. The particular clutch components 1E and 1A when configured as friction clutch in a disc configuration respectively each include a friction surface bearing and/or friction surface forming element. When configured as a disc clutch, the friction surfaces are formed either by surface portions configured directly at the particular discs or by an additional liner or coating provided at the discs. The operative engagement is generated by a shifting device 24 which preferably includes at least one piston element 3. The shifting device 24 is used for actuating the clutch device 1 and is characterized by at least two basic functional positions, the opening end position and the closing end position respectively corresponding with the functional condition "open" and "closed" of the shiftable clutch device 1.

In the embodiment as a variable speed shifting transmission the transmission 18 includes shift elements for activating/deactivating the particular gear stages covering different conversion ranges. The gear stages and the hydrodynamic component 20 are supplied with the respective media through an operating media supply and/or conduction system 25 which is not illustrated in detail. For feeding into the particular chambers and pressure cavities, thus a feed device in particular a transmission oil pump 26 is provided which is coupled with the input E of the force transmission device 19. In the basic function "open" of the shiftable clutch device 1 in which the drive train 11 is disconnected from the first drive machine 13, the shiftable clutch device 1 is not actuated. When stopping the vehicle with a decoupled drive machine 13, thus the hydraulic system can even run empty. In order to immediately provide the required pressure for the hydrodynamic component 20 and the shifting devices of the shift elements of the transmission 18 and of the shiftable clutch device 1 for closing the shifting devices, the transmission oil pump 26 has to be driven immediately. This is implemented according to the invention through devices 27 for transmitting a minimum torque between the drive machine 13 and the input E of the force transmission device 19 at least before the providing the required actuation pressure for the shift device 24 of the shiftable clutch device 1, wherein the clutch device, however, is configured so that the moment transferrable through the clutch device is limited. Thus, the devices 27 include at least a drag clutch 28 which can only transfer a torque which is greater than or equal to a predefined minimum moment which is configured to drive the transmission oil pump 26, the input E of the force transmission device 19 and the rotor 16.1 of the electrical machine 16 coupled with the input E and the pump shell P of the hydrodynamic component 20 and which is smaller than the torque transferrable through the shiftable clutch device 1.

The drag clutch 28 and the shiftable clutch device 1 are connected in parallel, this means the force flow respectively runs only through the shiftable clutch device 1 or the drag clutch 28 to the input E of the force transmission device 19. The drag clutch 28 can thus function as a separate clutch for bypassing the first and the second clutch component 1E and 1A of the shiftable clutch device 1 in that the drag clutch connects the first clutch component 1E and 1A or at least the elements connected torque proof with these clutch components torque proof with one another. The drag clutch 28 facilitates driving the input E of the force transmission device 19 and the transmission oil pump 26 connected therewith and after the pressure build up at the start element 9 in particular in the hydrodynamic component 20 a force flow from the first drive machine 13 to the transmission input shaft 21. Thus, the drag clutch 28 is configured and sized, so that it is configured to drive at least the feed device and possibly the rotor 16.1 of the second drive machine 15. The configuration is geared to a transferable minimum torque in a range of 3-80 Nm, preferably 3-30 Nm particularly preferably 3-20 Nm and is limited to a torque which is smaller than the torque that is transferrable with the actuatable clutch device 1.

The transferable minimum torque which is sized to be sufficient to facilitate at least driving the transmission oil pump facilitates omitting an additional pump and a drive system in the operating medium supply and conduction system. The entire supply of operating and control media is performed through a single feed device which also facilitates optimizing the conduit connections besides being able to omit the additional pump.

Actuating the shiftable clutch device 1 and the drag clutch 28 is preferably performed in a manner with forced coupling. This means the drag clutch 28 is closed when the shiftable clutch device 1 is opened and vice versa. Thus preferably the shifting devices 24 of the shiftable clutch device 1 and the shifting device 29 of the drag clutch 28 are coupled in a forced manner, in a particularly preferred embodiment they are formed by the same elements.

In a particularly preferred embodiment the drag clutch 28 is formed using components of the shiftable clutch device 1, the associated shifting device 24 and the elements connected torque proof there with. Thus the shiftable clutch device 1 includes two partial clutches 40.1 and 40.2, a first partial clutch 40.1 which functions as a main clutch and a second partial clutch 40.2 which forms the drag clutch 28. In particular the friction surface bearing and/or the friction surface forming elements of the first and second clutch component 1E, 1A function as a main clutch 40.1.

Thus, different embodiments are conceivable. FIGS. 2a-2d in a simplified schematic illustration in principle depict basic options to arrange and configure a drag clutch 28 as a partial clutch 40.2 of the shiftable clutch device 1. FIGS. 3-6 based on details from a hybrid system illustrated respectively to engineered embodiments of the principles illustrated in FIGS. 2a-2d. The remaining configuration of the combined force transmission and start up unit 30 is exemplary, wherein the figures represent a particularly advantageous embodiment.

Figure 2A:
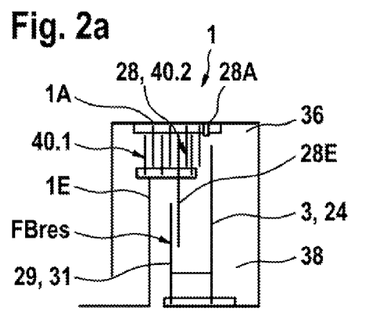
FIGS. 2a-2d illustrate basic embodiments of an actuatable clutch device according to the invention.

FIG. 2a illustrates a first embodiment of an arrangement of a drag clutch 28 configured as a partial clutch 40.2 of the shiftable clutch device 1. The first clutch component 1E and second clutch component 1A are illustrated in the first clutch component 1A respectively includes a disc support and friction surface bearing and/or friction surface forming element in the form of discs supported at the disc support in axially moveable manner and connected torque proof with the disc support. Thus, the first clutch component 1E is exemplary, which is connected with the first drive machine 13 configured as an internal disc support with inner discs, while the second clutch component 1A is formed by the outer disc support and outer discs, wherein the second clutch component 1A is simultaneously part of a housing 36 of the shiftable clutch device 1. The second clutch device 1A is connected torque proof with input E of the force transmission device 19, which is not illustrated, or it forms the input E. The drag clutch 28 is formed by a portion of the friction surface bearing and/or friction surface forming elements of the main clutch, in particular the first and second clutch component 1E, 1A. The actuation device 24 of the shiftable clutch device 1, in particular of the first clutch device 40.1, configured as a piston element 3, is connected torque proof with the second clutch component 1A of the main clutch or an element connected torque proof with the second clutch component, however, supported movable in axial direction forming a pressure cavity 38, which can be loaded with pressure medium. In order to load the piston element 3 for moving into the opening end position, an actuation device is provided, which imparts an actuation force. The resulting force $FB_{res}$ which results from the actuation force at the piston element 3 in a direction towards the opening end position, and the force generated in the pressure cavity 38 at the opposite face of the piston causes a movement of the piston element 3 into this functional position. In order to actuate the drag clutch 28, an actuation device 29 is also provided, including a piston element 31, which is preferably connected torque proof with the piston element 3, and also supported movable in axial direction at the second piston component 1A or an element connected torque proof therewith, and is loaded by the force $FB_{res}$ for closing the drag clutch 28. Since the shifting device 29 and the input 28E of the drag clutch 28 is formed by an element of the first clutch component 1E of the main clutch rotating at the speed of the first drive machine 13, rotate at different speed, a friction pairing is formed between the shifting device 29, in particular the piston element 31, and the friction surface bearing and/or friction surface forming element of the first clutch component 1E.

Figure 2B:
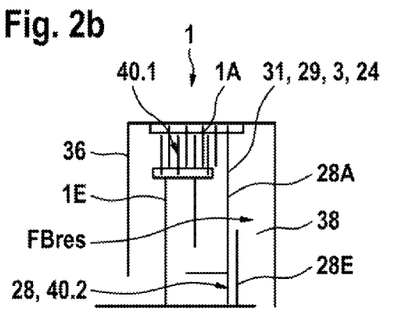
Figure 2C:
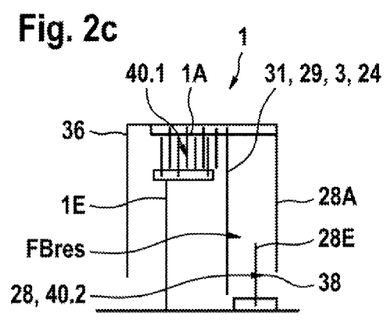
Figure 2D:
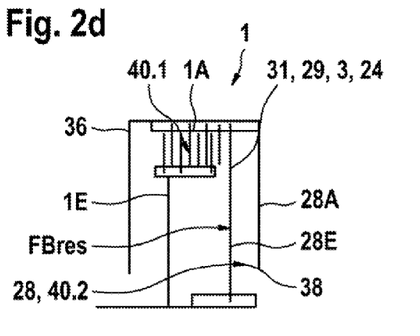

By comparison, FIGS. 2b through 2d respectively illustrate embodiments of the drag clutch 28 without using the friction surface bearing and/or friction surface forming elements of the partial clutch 40.1 functioning as a main clutch.

FIG. 2b illustrates an option to form the drag clutch 28 between the shifting device 24, in particular the piston element 3 of the shiftable clutch device 1, which is connected for this purpose torque proof and axially movable with a second clutch component 1A or an element connected torque proof with the second clutch component, and the first clutch component 1E or an element connected torque proof with this clutch component. The shifting device 24, in particular the piston element 3 of the main clutch simultaneously functions as shifting device 29 of the drag clutch 28, and advantageously functions simultaneously as an output 28A of the drag clutch 28. The forced coupling between the actuation of the first and second partial clutch 40.1 and 40.2 is implemented herein through the recited high functional concentration in the piston element 3.

FIG. 2c illustrates a preferred embodiment according to FIG. 2b, wherein herein the drag clutch 28 is formed between the second clutch component 1A of the partial clutch 40.1 functioning as a main clutch or an element connected torque proof with the second clutch component and the first clutch component 1E or an element connected torque proof but axially movable at the first clutch component 1E. The actuation device 24, in particular the piston element 3 of the main clutch, simultaneously functions as an actuation device 29 of the drag clutch 28 and is preferably connected torque proof but axially movable with the second clutch component 1A of the main clutch.

FIG. 2d illustrates and alternative embodiment of FIG. 2b with the drag clutch 28 formed between the actuation device 24 of the main clutch, in particular the piston element 3 and the second clutch component 1A of the main clutch or a main element connected torque proof with the second clutch component. Thus the actuation device 24 is coupled axially moveable and torque proof with the first clutch component 1E or an element connected torque proof with the first clutch component. The shifting device 24 in particular the piston element 30 of the main clutch functions as an actuation device 29 of the drag clutch 28 and advantageous also function as an input 28E of the drag clutch. The forced coupling between the actuation of the first and the second partial clutch 40.1 and 40.2 is thus implemented by the recited height functional concentration.

FIGS. 3-6 illustrated possible engineered embodiments of the options illustrated in FIGS. 2a-2d. Identical or like components in the Figures have identical numerals.

The drive shaft of the first drive machine 13 is apparent from FIGS. 3-6, in particular the engine output shaft and the transmission input shaft and the combined force transmission and drive unit 30 including a shiftable clutch device 1 and a force transmission device 19. Furthermore illustrated is the second drive machine 15 configured as an electrical machine 16 which is operable as a motor and/or generator. The rotor 16.1 in the illustrated case is connected torque proof with the input E of the force transmission device 19 while as illustrated supra the first drive machine 13 is connectable torque proof with the force transmission device 19 through the actuatable clutch device 1 or disconnect able from the clutch device 1. The driving is respectively performed alternatively exclusively by one of the drive machines 13, 15 or also in parallel through both. The electrical drive machine 16 is thus operable at least as a motor, preferably also as a generator. Depending on the operating mode of the electrical machine 16 different functions are thus obtained wherein during motor operation the function as a starter generator or the function of power feeding in addition to the first drive engine 13 is provided while during break operation or coasting operation the electrical machine 16 is preferably operated as a generator and a feeding of the mechanical energy converted into electrical energy can be performed into an energy storage device or a user network.

The force transmission device 19 as already recited supra includes a hydrodynamic component 20 and a shiftable clutch device 22. Through the hydrodynamic component 20, thus a first power path can be implemented in an open condition of the shiftable clutch device 22, while power transmission is implemented through a second preferably mechanical power path, when the shiftable clutch device 22 is closed. The shiftable clutch device is preferably configured as a friction clutch. In this case, furthermore a parallel power transmission is facilitated through the shiftable clutch device 22 and also through the hydrodynamic component 20. In an alternative embodiment, the shiftable clutch device is configurable as a synchronously shifting clutch.

In a particularly advantageous manner, the hydrodynamic component 20 is configured as a hydrodynamic speed-/torque converter. The hydrodynamic speed-/torque converter is used for simultaneous conversion of speed and torque in a predefined ratio relative to one another. The hydrodynamic speed-/torque converter includes at least a primary shell functioning as a pump shell P in a force flow from one of the drive machines 13, 15 to the transmission 18 and a secondary shell functioning as a turbine shell T, and at least one reactive link configured as a stator shell, which is not illustrated herein, and which can be supported so that it is fixated in a location but rotatable. It is furthermore conceivable to configure the hydrodynamic component 20 also as a hydrodynamic clutch. In this case, the hydrodynamic component 20 includes at least a primary shell functioning as pump shell P and a secondary shell functioning as a turbine shell T. The hydrodynamic clutch does not include a stator shell and is only used for speed conversion with the torque unchanged. The pump shell P and the first clutch component 22E of the shiftable clutch device 22 are connected torque proof with the input E of the force transmission device and form an integral unit. The second clutch component 22A and the turbine shell T are connected at least indirectly, thus e.g. through a vibration damper with an output A of the force transmission device 19 or the transmission input shaft 21.

In the illustrated embodiment, it is possible to join the particular components as preassembled units. Thus, the electrical machine, the force transmission device 19 and the clutch device 1 can be configured as combined startup- and force transmission device 30, which can be integrated between the first drive machine 13 and the transmission 18 in the force flow. The force transmission device 19 is configured as a wet running device based on its function, in particular based on the hydrodynamic component 20. The device configured as a shiftable clutch device 1 is preferably also configured as wet running clutch device, this means the components involved in power transmission are enveloped by an operating fluid, in particular oil at least during operation. The operating fluid can also remain at least partially in the components when they are not activated.

The engineering layout of the force transmission device 19 is typically provided so that it does not include an independent housing, but a pump shell PS, which is configured at the pump shell P, connected torque proof with a housing bell 34, which extends in axial direction forming an intermediary space 35 for receiving the shiftable clutch device 22, wherein depending on the configuration, the housing bell 34 can be configured so that, it forms the housing 36 when the shiftable clutch device 1 is configured as a wet clutch. In this case, an intermediary wall for dividing the particular pressure cavities between the force transmission device 19 and the shiftable clutch device 1 only has to be provided within the housing bell 34, wherein the intermediary wall is also designated as pressure cavity divider 6. Otherwise, it is conceivable to configure the housing bell 34 separately only for the force transmission device 19, which however, is connected torque proof with the housing 36 for the shiftable clutch device 1, forming or supporting the second clutch component 1A.

The solution according to the invention in a particular advantageous embodiment is usable in an embodiment of a drive train 11 configured as a hybrid system with a force transmission device 19 in two-channel configuration. This means, that the force transmission device includes at least two connections A1 and A2, and the operating fluid conduction in the particular operating modes is provided so that the actuation of the shiftable clutch device 22 is controllable through the pressure ratios at the two connections A1 and A2. The first connection A1 is connected with an operating cavity formed by the hydrodynamic component 20, while the second connection A2 is connected with an intermediary cavity 35, formed between the outer circumference of the hydrodynamic component 20 and the coupling of the pump shell P with the input E of the force transmission device 19, connected with the housing bell 34. Depending on the operating mode of the force transmission device 19, the hydrodynamic component 20 is thus flowed through in a centripetal or centrifugal manner. In the first case, operating fluid conduction is performed quasi through the second connection A2 between the particular clutch components 22E of the shiftable clutch device 22, generating a corresponding opening pressure for the clutch device 22 to the outer circumference of the hydrodynamic component 20, filling the hydrodynamic component 20 and generating a flow cycle in the operating cavity. In the second operating mode of the force transmission device 19, the hydrodynamic component is flowed through in a centrifugal manner, wherein the pressure at the shifting device of the shiftable clutch device 12 is increased and the shiftable clutch device 22 is closed. Both operating modes can be performed with the first drive machine 13 and also with the second drive machine 15. In a preferred embodiment, which is not illustrated herein, the force transmission device 19 can also be configured in three-channel configuration. In this case, the shifting device of the shiftable clutch device 22 can be actuated through a pressure cavity, which is associated with the clutch device and loadable with any pressure.

Figure 3:
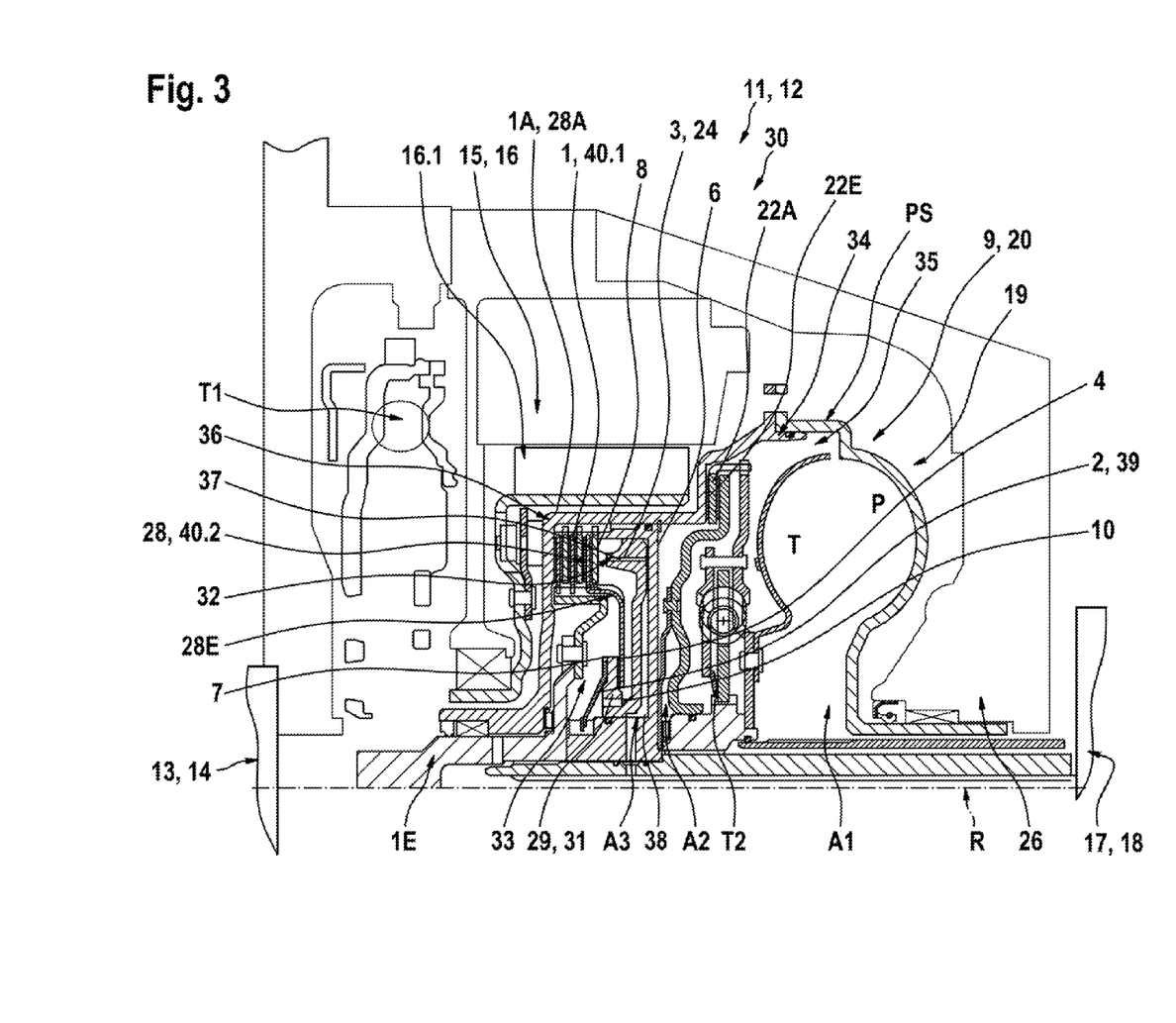
FIG. 3 illustrates a design embodiment with an actuatable clutch device according to FIG. 2a in a detail of an axial sectional view of a drive train in an exemplary manner.

According to a first embodiment, illustrated in FIG. 3 according to FIG. 2*a*, at least a portion of the friction surface bearing and/or friction surface forming elements, in particular discs of the particular clutch components 1E and 1A are used for transferring a predefined minimum torque. Thus, the clutch components are pressed in a mechanical manner in a direction towards the opening end position of the shifting device 24 of the partial clutch 40.1 functioning as a main clutch, in particular the piston element 3, and thus opposite to the actuation direction when closing the main clutch of the clutch device 1. The shifting device 29 of the second partial clutch 40.2 configured as a drag clutch 28 includes a piston element 31 and a device 39 for applying an actuation force at the piston element 31. The actuation force in the simplest case is applied through a device configured as a spring unit 2. Thus, the housing 36 of the actuatable clutch device 1, the piston element 3 and the spring unit 2 are configured coupled in the force flow on the converter side, this means coupled with the input E of the force transmission device 19. The spring unit 2 for opening the piston element 3 thus does not directly press against the piston element 3 of the main clutch but presses on an intermediary component 7, which functions as a piston element 31 for the second partial clutch 40.2. The input 28E of the drag clutch 28 is formed by a friction surface bearing and/or friction surface forming element, configured elongated in a radial direction, in a direction towards the rotation axis R, in particular a disc of the first clutch component 1E of the main clutch. The output 28A of the drag clutch 28 is then formed by at least one friction surface bearing and/or friction surface forming element of the second clutch component 1A of the main clutch, thus herein at least by the edge disc 8 of the shiftable clutch device 1, and an element connected torque proof therewith, in particular the housing 36. The edge disc 8 is thus supported at a wall connected torque proof with the housing 36, in particular a pressure cavity divider 6, between a pressure cavity 38 configured to load the piston element 3 for closing with a pressure medium through at least one connection A3 and the pressure cavities of the force transmission device 19.

The axial force of the spring unit 2, which is preferably configured in the form of a disc spring, generates in the illustrated case a drag torque at least at two friction surface bearing and/or friction surface forming elements that can be brought into operating engagement with one another, wherein the elements are associated with the clutch components 1E and 1A of the shiftable clutch device 1, which can be brought into operative engagement with one another, wherein the operative engagement facilitates a propulsion to the input E of the force transmission device 19 and thus to the pump shell P of the hydrodynamic component 20 coupled with the input E and the feed device directly coupled with the pump shell P, in particular the transmission oil pump 26.

The intermediary piece 7 forming the piston element 31 is supported axially movable at the piston element 3 of the actuation device 24. A stop 10 between the intermediary component 7 and the piston element 3 thus assures that the piston element 3 can be moved by the spring unit 2 and the disc 4 formed by the intermediary component 7 for configuring a friction pairing between the intermediary component and a friction surface bearing element of the first clutch component 1E is not pressed against the piston element 3. Furthermore, the rotation safeties which are not illustrated herein assure that the piston element 3, the intermediary component 7 and the spring unit 2 rotate with the speed of the input E of the force transmission device 19 and thus of the hydrodynamic speed-/torque converter, in particular of the pump shell P.

In normal operating mode, this means when pressure loading the shifting device 24, in particular the piston element 3, and the piston side facing away from the shiftable clutch, in particular the particular discs, it is required to configure the pressure in the pressure cavity 38, so that the pressure overcomes the force of the spring unit 2 during actuation.

Figure 4:
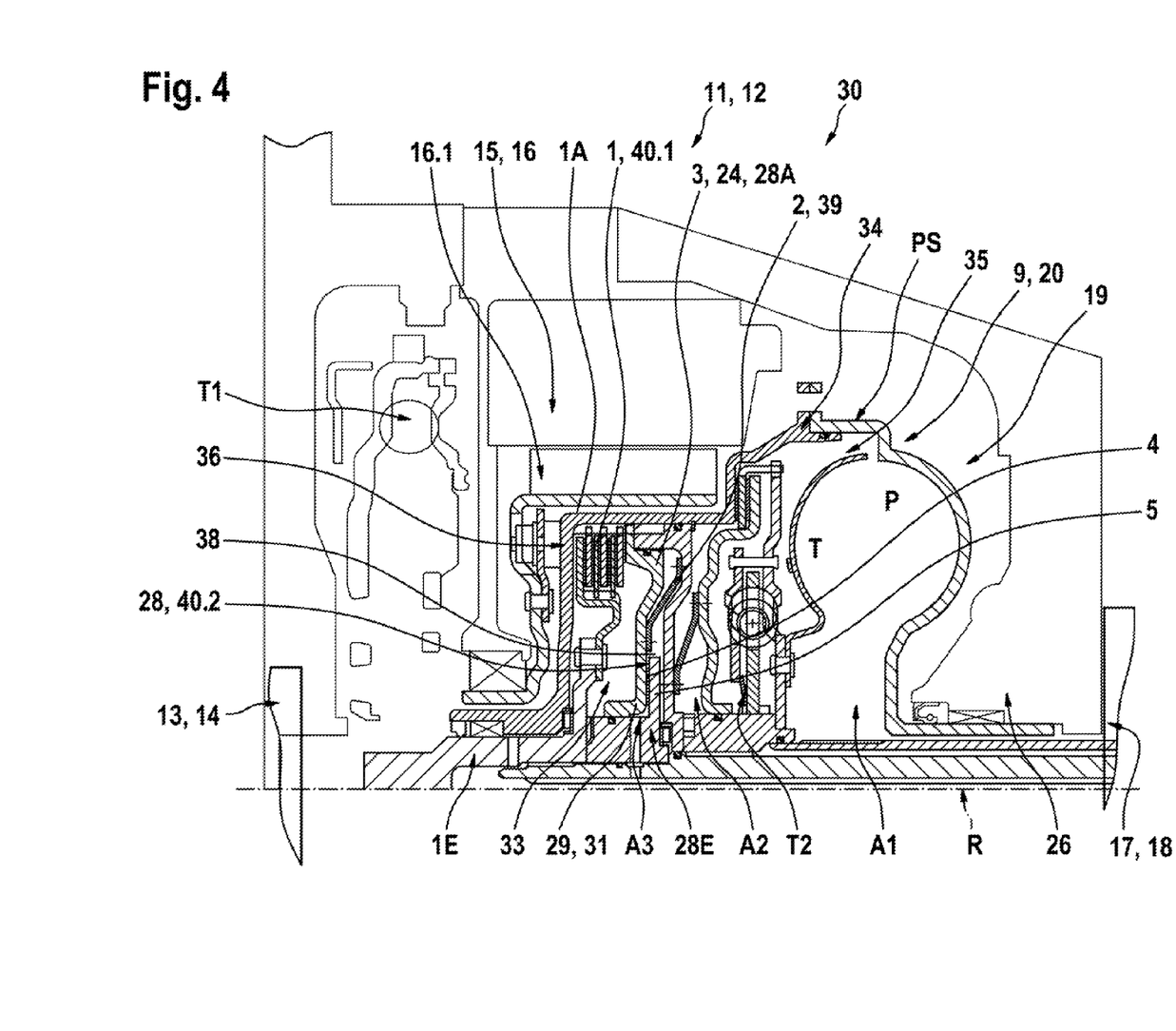
FIG. 4 illustrates a design embodiment with an actuatable clutch device according to FIG. 2b in a detail of an axial section view of a drive train in an exemplary manner.

In a preferred embodiment, it is provided as illustrated in FIG. 4 with reference to an embodiment according to FIG. 2*b*, to configure the shiftable clutch device 1 with an uneven number of friction surface bearing or friction surface forming elements. Also here, a spring unit 2 is configured as a device 39 which however is arranged and configured so that it pulls the piston element 3 into the open end position, in which the piston face oriented away from the friction surface bearing and friction forming elements of the shiftable clutch device 1, wherein the piston face has a friction surface 4 attached thereto or configured thereon, and is moved against a component 5 rotating with the speed of the first drive machine 13 in particular engine speed. The drag clutch 28 is formed between the piston element 3 and the element connected torque proof with the first clutch component 1E, in particular a hub, and generates the friction torque necessary for emergency operations. The component 5 forms the input 28E and the actuation device 24, in particular the piston element 3, forms the output 28A, and simultaneously also the shifting device 29 for the drag clutch 28. Thus, in this case, the force transmission from the sides of the input of the shiftable clutch device 1 is performed to the input E of the force transmission device 19 using the shifting device 24.

When the pressure cavity 38 is loaded with low pressure, the piston element is moved from the open end position into an intermediary position in which friction free operation is possible. The partial clutch 40.1 is closed for a higher pressure in that the piston element is moved into the closing end position.

Figure 5:
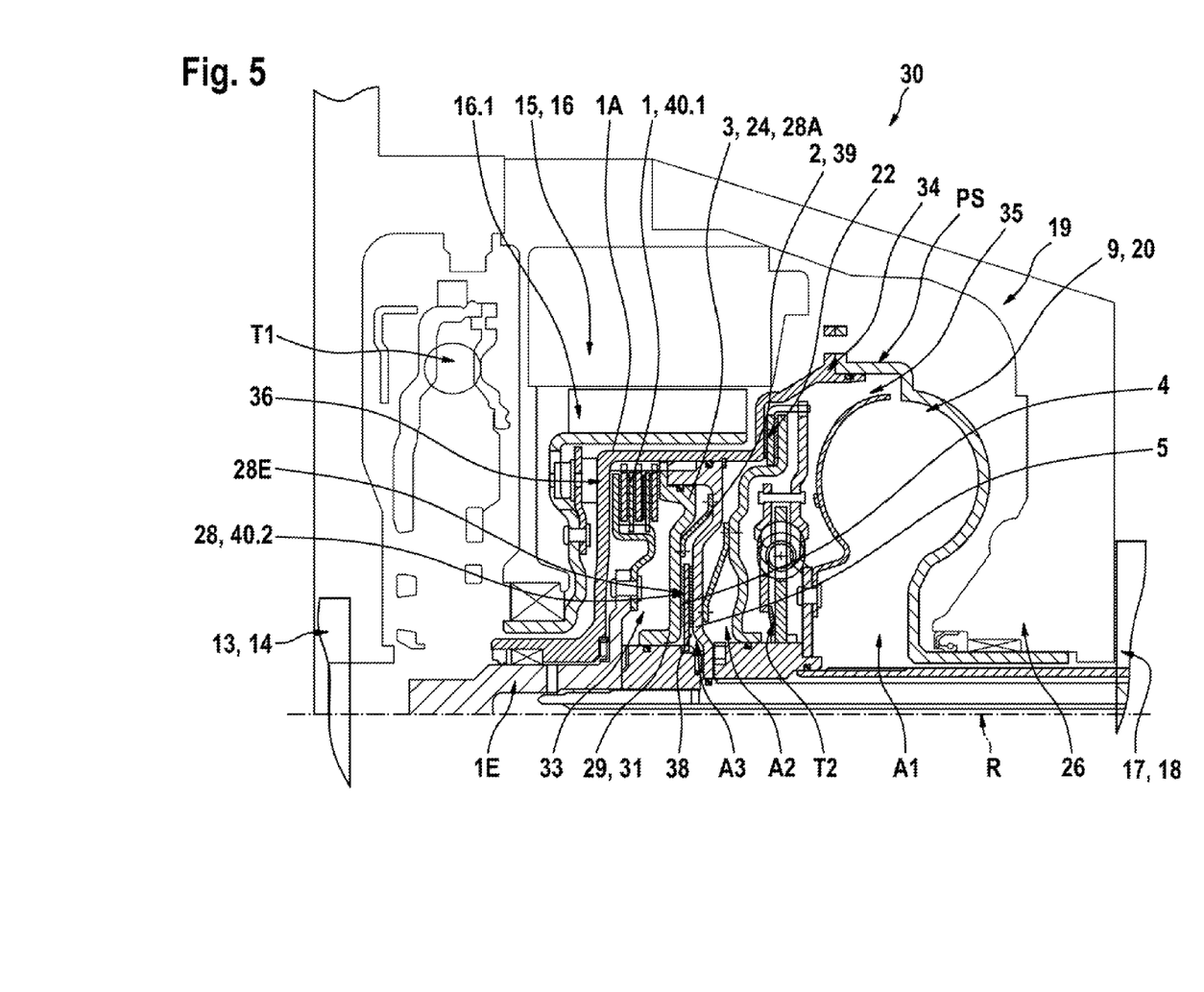
FIG. 5 illustrates a design embodiment with an actuatable clutch device according to FIG. 2c in a detail of an axial section view of a drive train in an exemplary manner.

By comparison FIG. 5 illustrates an improved embodiment according to FIG. 4 according to an embodiment in FIG. 2*c*, wherein, however, the friction pairing of the actual drag clutch 28 is not formed at the piston backside, but by an element connected torque proof with the first clutch component 1E, in particular a disc with two friction liners 4 connected torque proof with the engine side, and with an element connected torque proof with the second clutch component 1A, in particular a housing 36 or a pressure cavity divider 6. Also here, the drag clutch 28 is provided between the actuation device 24 and the force transmission device 19. The piston element 3 can be connected in this case torque proof with the second clutch component 1A, and can be movably supported thereon in axial direction, wherein the support in the portion of the inner circumference is provided without a torque proof connection and movable in axial direction at an element coupled with the first clutch component 1E. The piston element 3 forms the shifting device 24 and 29. The input 28E of the drag clutch 28 is formed by the element connected torque proof with the clutch component 1E, in particular the component 5 configured as a hub, and the friction surface forming disc connected torque proof with the hub. The output 28A is formed by the housing 36, in particular by the wall forming the pressure cavity divider.

Figure 6:
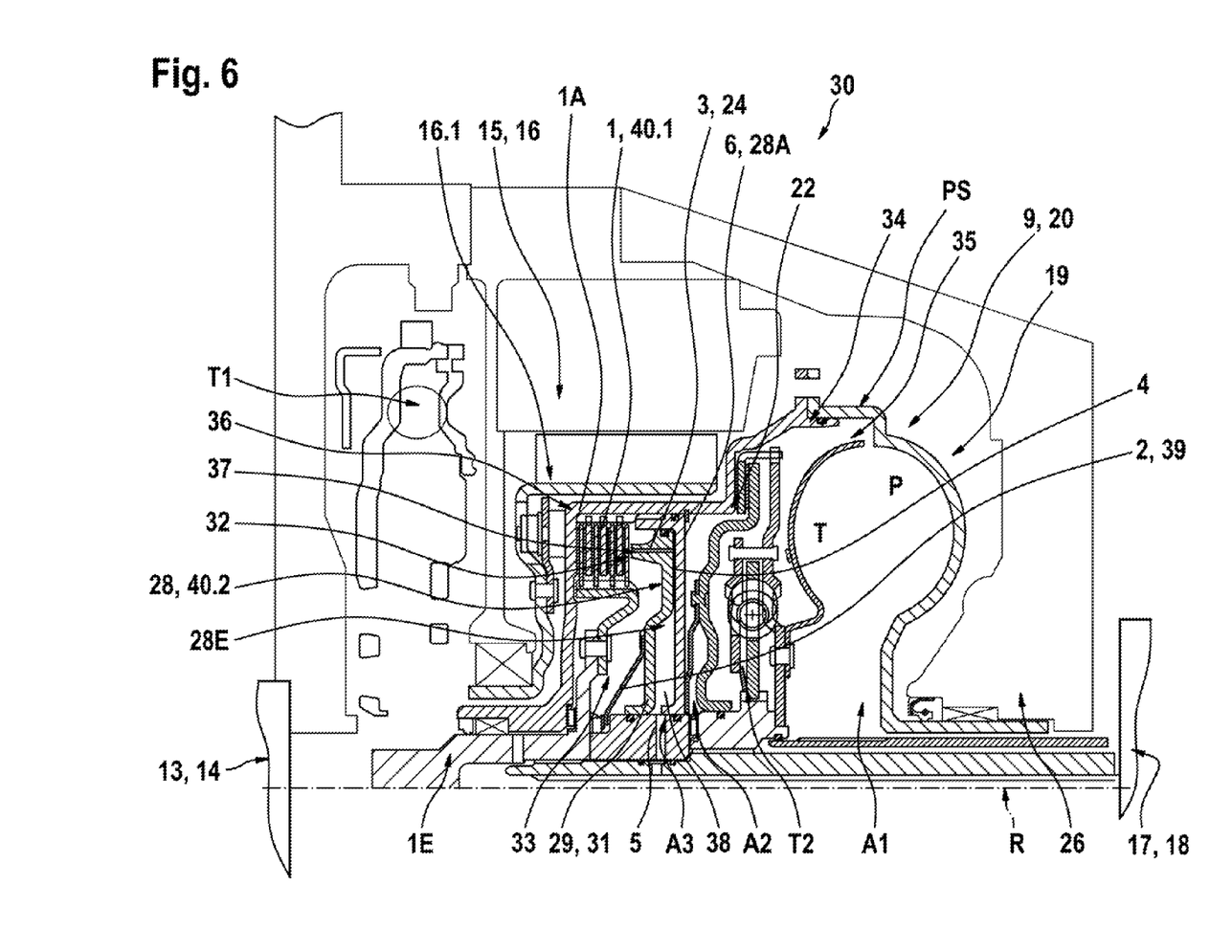
FIG. 6 illustrates a design embodiment with an actuatable clutch device according to FIG. 2d in a detail of an axial section view of a drive train in an exemplary manner.

FIG. 5 illustrates an embodiment in which the piston element 3 is connected torque proof with the output of the shiftable clutch device 1, in particular at the outer disc support. FIG. 6 illustrates a preferred embodiment in which the frictional engagement between a wall forming an input E of the force transmission device 19, in particular the pressure cavity divider 6 and the first clutch component 1E of the shiftable clutch device 1 is formed, wherein the shifting device 24 configured as piston element 3 is used essentially for obtaining a frictional engagement as a shifting device 29 and an input 28E of the drag clutch. Thus, e.g. the clutch device 1 is configured with an uneven number of friction liners, the piston element 3 is connected torque proof with the components on the drive machine side, in particular an element 5 connected torque proof with the internal combustion engine 14, and also the associated friction discs, which are preferably configured directly at the piston element 3. The spring unit 2 forming the device 39 presses the piston element 3 into the opening end position, in which a friction liner 4 disposed at the piston backside oriented away from the particular discs rubs against a component running with converter speed, in particular the housing wall or the pressure cavity divider 6. Thus, the friction torque required for emergency operations is generated. When the piston cavity 38 and thus the piston element 3 are loaded with a lower pressure, the friction pairing is disengaged, so that frictionless operation is facilitated. The engine side clutch 1 is closed at a higher pressure.

In all embodiments, the solution according to the invention is characterized in that the shiftable clutch device is not closed in order to provide a low transferable minimum torque that is required for emergency operations, but is disposed in the "opening" position, wherein however in this position another partial clutch 40.2 is activated, which is configured using the components of the shiftable clutch device 1, in particular of the particular elements of the particular clutch components 1E, 1A, bearing friction surfaces and/or forming friction surfaces, configured to be brought into operative engagement with one another, and the elements connected torque proof with these elements and shifting device 24. Thus, the complexity for forming the additional second clutch device in the form of a so-called drag clutch 28 can be kept to a minimum. Typically, only a few additional elements are required, which are used for implementing this function.

Furthermore, a particularly advantageous embodiment for providing a cooling flow is provided in all figures. Between the pressure cavity 38 of the shifting device 24 of the shiftable clutch device 1, wherein the pressure cavity is loadable with pressure medium, and the clutch environment which corresponds to the inner cavity 33 of the clutch device 1, a flow connection 37 is provided, whose flow-through cross section is controllable as a function of the size of the contact pressure force. In order to assure automatic control, a connection between the pressure cavity 38 and the inner cavity 33 is provided through the shifting device 24 in a preferred embodiment, wherein the shifting device is preferably implemented as a piston element 3, wherein the connection opens into the portion of the piston surface 32, which is effective at the clutch components to be connected, and thus automatically a connection of the flow-through cross section occurs with increasing actuation force in a direction towards closing the main clutch, and thus the closing end position of the actuation device 4 through coverage. An embodiment of this type is illustrated in FIGS. 3 and 6 in an exemplary manner.

REFERENCE NUMERALS AND DESIGNATIONS 1 shiftable clutch device in particular wet clutch
1E first clutch component
1A second clutch component
2 spring unit
3 piston element
4 disc
5 component
6 pressure cavity divider
7 intermediary component
8 edge disc
9 startup element
10 stop
11 drive train
12 hybrid system
13 first drive machine
14 internal combustion engine
15 second drive machine
16 electrical machine
16.1 rotor of electrical machine
17 transmission unit
18 transmission
19 force transmission device
20 hydrodynamic component
21 transmission input shaft
22 shiftable clutch device
22A second clutch component
22E first clutch component
24 shifting device
25 operating medium supply and/or -conduction system
26 feed device, in particular transmission oil pump
27 minimum torque transfer device
28 drag clutch
28E input of drag clutch
28A output of drag clutch
29 shifting device
30 combined force transmission- and startup unit
31 piston element
32 effective piston surface
33 inner cavity
34 housing bell
35 inner cavity
36 housing
37 fluid dynamic connection
38 pressure cavity
39 actuation force generation device for opening the clutch device
40.1, 40.2 partial clutches
E input
A output
R rotation axis
P pump shell
T turbine shell
L stator shell
A1, A2, A3 connections
T1, T2 vibration damper
$FB_{res}$ resulting force
PS pump shell

What we claim is:

1. A shiftable clutch device (1), said shiftable clutch device being a friction wet clutch, for disconnecting and connecting a first drive machine (13) and a drive train (11), the shiftable clutch device (1) comprising a shifting device (24) actuatable through a pressure medium, wherein the shiftable clutch device (1) includes two partial clutches (40.1, 40.2), a first partial clutch (40.1) forming a main clutch and a second partial clutch (40.2) forming a drag clutch (28), wherein the partial clutches are arranged and configured, so that each of them is adapted to generate a friction torque respectively in an end position of the shifting device (24), a first opening end position characterized by an open condition of the main clutch and a second closing end condition characterized by a closed condition of the main clutch.

2. The shiftable clutch device (1) according to claim 1, wherein the two partial clutches (40.1, 40.2) are shiftable in parallel.

3. The shiftable clutch device (1) according to claim 1, wherein the second partial clutch (40.2) that is actuatable in the opening end position of the shifting device (24) is configured and arranged, so that a lower torque is transferrable therewith, compared to the actuated first partial clutch (40.1) in the closing end position of the shifting device (24).

4. The shiftable clutch device (1) according to claim 1, wherein the torque transferable through the second partial clutch (40.2) actuated in the opening end position is in a range between 3 Nm and 80 Nm.

5. The shiftable clutch device (1) according to claim 4, wherein the torque transferable through the second partial clutch (40.2) actuated in the opening end position is in a range between 3 Nm to 20 Nm.

6. The shiftable clutch device (1) according to claim 5, wherein the torque transferable through the second partial clutch (40.2) actuated in the opening end position is 10 Nm.

7. The shiftable clutch device (1) according to claim 1, wherein the shifting device (24) includes at least one piston element (3) which is movable through a mechanical preloading force into the opening end position wherein said mechanical preloading force is a spring force.

8. The shiftable clutch device (1) according to claim 7, wherein the partial clutches (40.1, 40.2) are configured and arranged, so that the pressure force that can be generated at the piston element (3) through pressure loading the piston element is adjustable, so that the pressure force is in an equilibrium with the mechanical preloading force in an intermediary position between both end positions of the shifting device (24) characterized by opening both partial clutches (40.1, 40.2).

9. The shiftable clutch device (1) according to claim 1, wherein the shifting device (24) includes at least one piston element (3) which is movable into the closing end position through pressure loading through a pressure medium, wherein said pressure medium is a fluid.

10. The shiftable clutch device (1) according to claim 1, wherein the first partial clutch (40.1) includes a first clutch component (1E), configured to be coupled with a drive machine (13), and a second clutch component (1A), configured to be coupled with an output, wherein both clutch components include friction surface bearing and/or friction surface forming elements, and are configured to be brought into at least indirect operative engagement with one another through the shifting device (24), and the shifting device (24) includes at least one piston element (3) which forms a pressure cavity (38) that is loadable with a pressure medium and which is connected at least indirectly torque proof with one of the clutch components (1E, 1A) and supported movable in axial direction, and a device (39) for generating a mechanical actuation force opposed to the pressure force generatable in the pressure cavity (38) is associated with the piston element (3).

11. The shiftable clutch device (1) according to claim 10, wherein the device (39) for generating a mechanical actuation force includes a preloading element which is configured as one of the following elements, depending on the arrangement and the force orientation to be provided:
a tension spring device;
a compression spring device; and
a disc spring device, and is disposed between the shifting device (24) and one of the clutch components (1E, 1A) of the shiftable clutch device (1) or a component connected torque proof therewith.

12. The shiftable clutch device (1) according to claim 10, wherein the second partial clutch (40.2) includes an additional shifting device (29), to which the shifting device (24) of the first partial clutch (40.1) is coupled in a forced manner for actuation.

13. The shiftable clutch device (1) according to claim 10, wherein the shifting device (29) of the second partial clutch (40.2) is formed by the shifting device (24) of the first partial clutch (40.1).

14. The shiftable clutch device (1) according to claim 10, wherein the second partial clutch (40.2) is formed at least partially by friction surface bearing and/or friction surface forming elements of the first partial clutch (40.1).

15. The shiftable clutch device (1) according to claim 10, wherein the second partial clutch (40.2) is formed by a component (5, 6) which is connected torque proof with the first or the second clutch component (1E, 1A) or a component connected torque proof therewith, and the respective other clutch component (1A, 1E) or an element (6, 5) connected torque proof therewith.

16. The shiftable clutch device (1) according to claim 10, wherein the shifting device (24) is connected torque proof with the first or the second clutch component (1E, 1A), or an element (5, 6) connected torque proof therewith, and the second partial clutch (40.2) is configured between the shifting device (24) and the respective other clutch component (1A, 1E) or an element (6, 5) connected torque proof therewith.

17. The shiftable clutch device (1) according to claim 10, wherein the pressure cavity (38) that is loadable with pressure medium is flow connected with an inner cavity (33) of the shiftable clutch device (1) forming a clutch enclosure and enclosed by a housing (36), and devices for controlling the cooling media flow are provided, so that the cooling media flow generated through a flow connection (37) decreases with increasing pressure in the pressure cavity (38).

18. The shiftable clutch device (1) according to claim 17, wherein a controllable valve device is provided in the flow connection (37) between the pressure cavity (38) and the clutch enclosure.

19. The shiftable clutch device (1) according to claim 17, wherein the connection (37) between the pressure cavity (38) and the clutch enclosure includes at least one connection bore hole disposed in the piston element (3), wherein the connection bore hole opens on the side of the clutch enclosure in an area of the effective contact pressure surface of the piston element (3) at the clutch components (1E, 1A).

20. A drive train (11) for a hybrid system (12) of a vehicle comprising at least a first drive machine (13) and a second drive machine (15), which are connectable separately or jointly through a force transmission device (19) with a transmission unit (17) and comprising a shiftable clutch device (1) disposed between the first drive machine (13) and the force transmission device (19) for disconnecting and connecting the first drive machine (13) and the drive train (11), wherein a torque transferring operative engagement from the first drive machine (13) to an input (E) of the force transmission device (19) is establishable for an open, disconnected shiftable clutch device (1);
wherein said transmission unit is a transmission (18); and,
wherein devices (27) for transmitting a predefined minimum torque are provided including a drag clutch (28), shiftable in parallel with the shiftable clutch device (1).

21. The drive train (11) according to claim 20, wherein the drag clutch (28) is formed by a separate clutch.

22. The drive train (11) according to claim 20, wherein the shiftable clutch device (1) for disconnecting and connecting the first drive machine (13) and the drive train (11) is configured according to one of the claims 1 through 17.

* * * * *